Aug. 17, 1926.

J. J. RYAN

WASTE VALVE

Filed Nov. 28, 1924

1,596,121

Inventor.
John J. Ryan,
by Parker & Carter
Attorneys.

Patented Aug. 17, 1926.

1,596,121

UNITED STATES PATENT OFFICE.

JOHN J. RYAN, OF CHICAGO, ILLINOIS.

WASTE VALVE.

Application filed November 28, 1924. Serial No. 752,505.

This invention relates to a valve which is primarily adapted for use as a waste valve in connection with baths and bath tubs. It has for one object to provide in a valve an overflow connection means whereby the overflow connection will not become clogged. Another object is to provide means whereby the discharge from the normal outlet will not back up into the overflow connection and thus tend to deposit foreign matter within it and to clog it. Other objects will appear from time to time throughout the specification and claims.

My invention is illustrated more or less diagrammatically in the accompanying drawing, wherein.

Like parts are designated by like characters throughout.

A is a valve housing provided with an upper and lower opening $A^1$ and $A^2$. It has projecting within it a cage B which has an opening $B^1$ to the outside, and a small opening $B^2$ to the interior of the valve, above which is a somewhat larger opening $B^3$ which opens also to the interior of the valve. Each of the openings $B^2$ $B^3$ is provided on its upper surface with a seat in which a valve closing member is adapted to be seated.

Within the valve housing and communicating with the upper and lower part of the valve, and passing around the cage B is a discharge connection C. By means of this arrangement, and this connection in particular, when both of the openings to the valve cage B are closed, discharge may take place from top to the bottom of the valve, around the valve cage and out of the valve.

Figure 1:
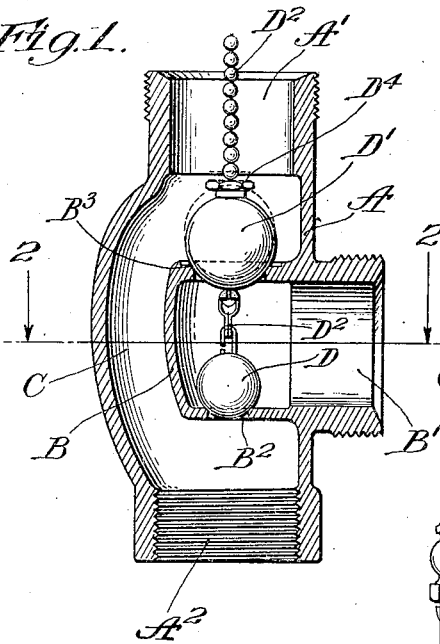
Figure 1 is a vertical cross section through the valve.
Figure 2:
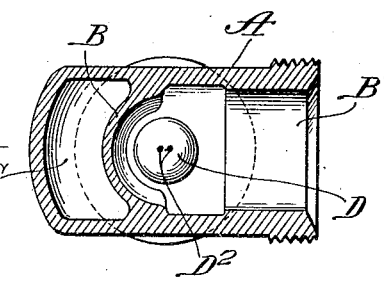
Figure 2 is a horizontal cross section taken on the line 2—2 of Figure 1.
Figure 3:
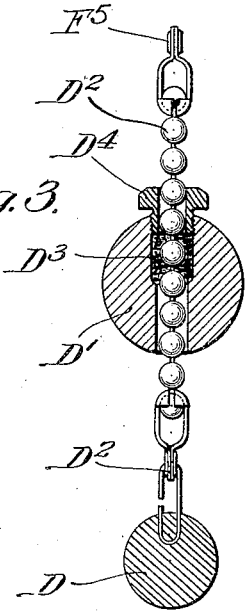
Figure 3 is a vertical cross section on an enlarged scale showing the valve closing members.

D is a small preferably spherical valve closing member. In the form here shown it is designed to be a metallic ball, but it might be made of other substances and it might have a different shape. $D^1$ is a second metallic ball, the ball D being seated as shown in Figure 1 in the opening $B^2$ and the ball $D^1$ in the opening $B^3$. $D^2$ is a chain connecting the balls D and $D^1$ and passing through the ball $D^1$ where it is seated in a packing $D^3$ which is braced and held in place by means of a member $D^4$. The chain, of course, might be fastened to the member $D^1$ in a variety of ways.

Figure 4:
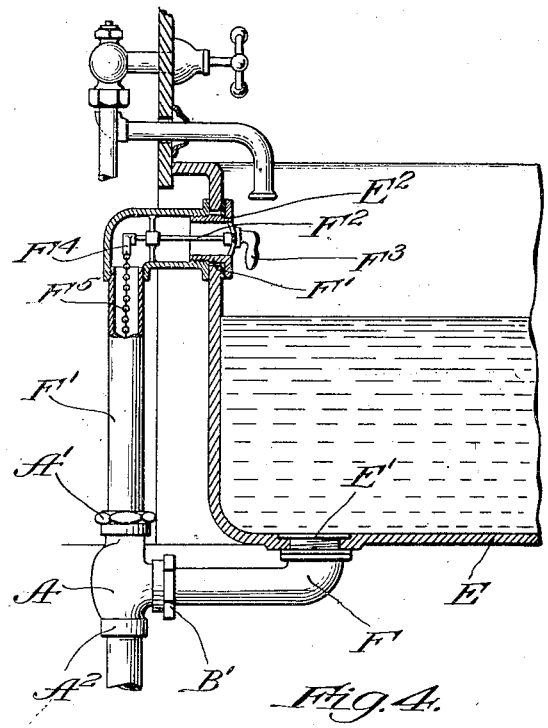
Figure 4 is a vertical cross section through a bath tub to which my valve and overflow connection have been applied.

As shown in Figure 4 the valve is mounted in a bath tub E, which has a normal drain opening $E^1$ and the overflow openings $E^2$. Connected to the drain opening $E^1$ is a discharge outlet F which communicates with the opening $B^1$ in the valve. Extending upwardly from the valve housing A is an overflow connection $F^1$. Within this connection is an operating mechanism consisting of a shaft $F^2$, a handle $F^3$, eccentric $F^4$ and a chain $F^5$, the chain $F^5$ being attached to the chain $D^2$ above mentioned.

Although I have shown an operative device, it will be obvious that many changes might be made in size, shape and arrangement of parts without departing materially from the spirit of my invention; and I wish therefore that my showing be taken as in a sense diagrammatic.

The use and operation of my invention are as follows:

When the tub is full, the parts are as shown in Figure 1. The weight of the balls and their respective areas exposed to the pressure of water from within the tub is such that they will not be raised from their seats, and they will remain seated and escape from the tub will be prevented. If the level of the water in the tub rises above the predetermined limit, the water will overflow through the overflow connection and pass down and out through the main drain. When it is desired to open the valve to cause discharge from the tub the control handle is manipulated and the balls are raised from their seats. The water then is discharged from the upper and lower openings in the valve cage within the valve housing and passes downward and out.

The area of the discharge opening from the tub is less than that of the discharge opening through the valve proper, and therefore any tendency for the water during discharge to back up and to fill the overflow pipe up to the level of the water in the tub, is resisted and the water flows directly from the tub into the valve and down.

Experience has shown in the past that with other types of discharge valves water during discharge backs up through the overflow drain, and since the current is comparatively slow, material is easily deposited from the water and clogging of the overflow pipe takes place.

I claim:

1. A valve including in combination an overflow connection and an outlet, means for preventing liquid from passing through the outlet into the overflow connection, said means including a valve cage in communication with the main outlet and provided with a plurality of openings and movable closures therefor, said openings adapted to discharge into the waste pipe below the overflow connection.

2. In combination in an outlet valve for bath tubs a waste connection and a main outlet, means for preventing water from the tub from rising into the waste outlet when the main outlet is open and when it is closed, said means including a valve cage projecting into the waste outlet and provided with a plurality of openings and movable closures therefor.

3. A waste valve for bath tubs including in combination an overflow connection and a waste outlet, and a valve into which each of them discharges, said valve being provided in its interior with a cage communicating with the waste outlet and having upper and lower perforations, and provided with balls attached to a chain and adapted to be seated in said upper and lower outlets to close them, said valve being provided about said cage with an enlarged passage, the cross sectional area of this passage being greater than the cross sectional area of the discharge outlet, whereby when the discharge outlet is open water does not pass upward into the overflow outlet connection.

4. A waste valve for liquid containing receptacles including in combination an overflow connection and a waste outlet, and a valve member into which each of them discharges, said valve being provided in its interior with a cage communicating with the waste outlet and having a plurality of effective perforations and provided with a plurality of movable closures for such perforations, said closures adapted to be seated one in each of said perforations and to be moved to open such perforations, one of said closures when so moved from the perforation in which it has been seated being adapted substantially to prevent discharge through another of such openings.

5. A waste valve for liquid containing receptacles including in combination an overflow connection and a waste outlet, and a valve member into which each of them discharges, said valve being provided in its interior with a cage communicating with the waste outlet and having a plurality of effective perforations and provided with a plurality of movable closures for such perforations, said closures adapted to be seated one in each of said perforations and to be moved to open one of such perforations, one of said closures when so moved from the perforation in which it has been seated being adapted substantially to prevent discharging through another of such openings, said valve being provided about said cage with an enlarged passage, the cross sectional area of such passage being greater than the cross sectional area of the discharge outlet.

6. A waste valve for liquid carrying receptacles including in combination an overflow connection and a waste outlet and a valve into which each of them discharges, said valve provided in its interior with a cage communicating with the waste outlet and having upper and lower perforations and provided with members adapted to be seated in and to close each of such perforations, and means for moving such members whereby the lower perforation is open and the other perforations substantially closed by the member normally seated in the lower perforation.

Signed at Chicago, county of Cook and State of Illinois, this 21st day of November 1924.

JOHN J. RYAN.